US012783005B2

(12) United States Patent
Yamamoto et al.

(10) Patent No.: US 12,783,005 B2
(45) Date of Patent: Nov. 3, 2026

(54) ELECTRONIC APPARATUS

(71) Applicant: Panasonic Intellectual Property Management Co., Ltd., Osaka (JP)

(72) Inventors: Koki Yamamoto, Osaka (JP); Keita Endo, Osaka (JP); Junichi Hasegawa, Osaka (JP); Shintarou Tanaka, Osaka (JP); Hiroki Kamezaki, Osaka (JP); Jun Takahashi, Miyagi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 67 days.

(21) Appl. No.: 19/055,049

(22) Filed: Feb. 17, 2025

(65) Prior Publication Data

US 2025/0190013 A1 Jun. 12, 2025

Related U.S. Application Data

(63) Continuation of application No. PCT/JP2023/029268, filed on Aug. 10, 2023.

(30) Foreign Application Priority Data

Sep. 1, 2022 (JP) ................................ 2022-139400

(51) Int. Cl.
*G06F 1/16* (2006.01)

(52) U.S. Cl.
CPC .................................. *G06F 1/1616* (2013.01)

(58) Field of Classification Search
USPC ..................................................... 361/679.27
See application file for complete search history.

(56) References Cited

U.S. PATENT DOCUMENTS

2003/0137801 A1 7/2003 Shimada et al.
2007/0211418 A1 9/2007 Iwamoto et al.
2010/0097749 A1* 4/2010 Kaneko ................ G06F 1/1616 361/679.21
2015/0054391 A1 2/2015 Matsuyama et al.

FOREIGN PATENT DOCUMENTS

JP 2003-204174 A 7/2003
JP 2007-272860 A 10/2007
JP 2015-061730 A 4/2015

OTHER PUBLICATIONS

International Search Report for related International Patent Application PCT/JP2023/029268 mailed Sep. 26, 2023.

* cited by examiner

*Primary Examiner* — Hung S. Bui
(74) *Attorney, Agent, or Firm* — RENNER, OTTO, BOISSELLE, & SKLAR

(57) ABSTRACT

An electronic device includes a first housing and a second housing rotatably coupled to the first housing about a rotation axis and having a display disposed therein. The second housing includes a first outer surface on which the display is exposed and a second outer surface facing away from the first outer surface. A stepped portion is provided on the second outer surface, the stepped portion extending in an intersecting direction that intersects with the rotation axis and is parallel to the second outer surface. A rib extending in the intersecting direction is provided on a back surface of the second outer surface. At least a part of the rib is at a position overlapping the stepped portion in the intersecting direction.

7 Claims, 8 Drawing Sheets

ELECTRONIC APPARATUS

TECHNICAL FIELD

The present disclosure relates to an electronic device in which a stepped portion is formed on an outer surface of a housing.

BACKGROUND ART

PTLs 1 and 2 disclose a portable information processing apparatus such as a notebook computer (laptop PC). In the portable information processing apparatus, a liquid crystal display panel is disposed between a back surface housing and a front surface housing. A raised portion is formed on the back surface housing. The raised portion forms a stepped portion on an outer surface of the back surface housing. This stepped portion increases the strength of the back surface housing.

CITATION LIST

Patent Literature

PTL 1: Unexamined Japanese Patent Publication No. 2007-272860

PTL 2: Unexamined Japanese Patent Publication No. 2003-204174

SUMMARY OF THE INVENTION

An object of the present disclosure is to provide an electronic device capable of increasing a degree of freedom in design of a housing while maintaining the strength of the housing.

An electronic device according to one aspect of the present disclosure includes a first housing in which an input unit is disposed, and a second housing rotatably coupled to the first housing via a hinge, the second housing having a display disposed therein. The second housing includes a first outer surface from which the display is exposed, a second outer surface facing away from the first outer surface, a stepped portion is provided on the second outer surface, the stepped portion extending in an intersecting direction that intersects with a rotation axis of the first housing and the second housing and is parallel to the second outer surface, a rib extending in the intersecting direction is provided on an inner surface that is a back surface of the second outer surface, at least a part of the rib is at a position overlapping the stepped portion in the intersecting direction, the rib is provided at the position overlapping the stepped portion as viewed from a direction orthogonal to the second outer surface, or at a position between the stepped portion and a center of the second outer surface in a width direction parallel to the rotation axis, a size of the stepped portion decreases from one side to another side of the second outer surface in the intersecting direction, and a height of the rib at a portion overlapping the stepped portion in the intersecting direction increases from one side to another side of the inner surface in the intersecting direction.

According to the present disclosure, it is possible to provide the electronic device capable of increasing the degree of freedom in design of the housing while maintaining the strength of the housing.

DESCRIPTION OF EMBODIMENT

Background of Present Disclosure

In the portable information processing apparatuses disclosed in PTLs 1 and 2, a stepped portion is formed in a housing. The stepped portion is formed, and thus, the strength of the housing is enhanced.

In the portable information processing apparatuses disclosed in PTLs 1 and 2, a height of the stepped portion is constant. The restriction of forming the stepped portion having the constant height in the housing fixes the appearance of the housing to a limited shape. That is, a degree of freedom of the design of the housing is lowered.

In a case where the above-described restriction is eliminated, the degree of freedom of the design of the housing can be increased, but the strength of the housing may be reduced.

Therefore, the present inventors have found that the degree of freedom in the design of the housing can be increased while maintaining the strength of the housing by forming the stepped portion that decreases toward one direction on an outer surface and forming a rib that increases toward a direction opposite to the one direction on a back surface of the outer surface, and have reached the following disclosure.

EXEMPLARY EMBODIMENT

[Overall Configuration]

Figure 1:
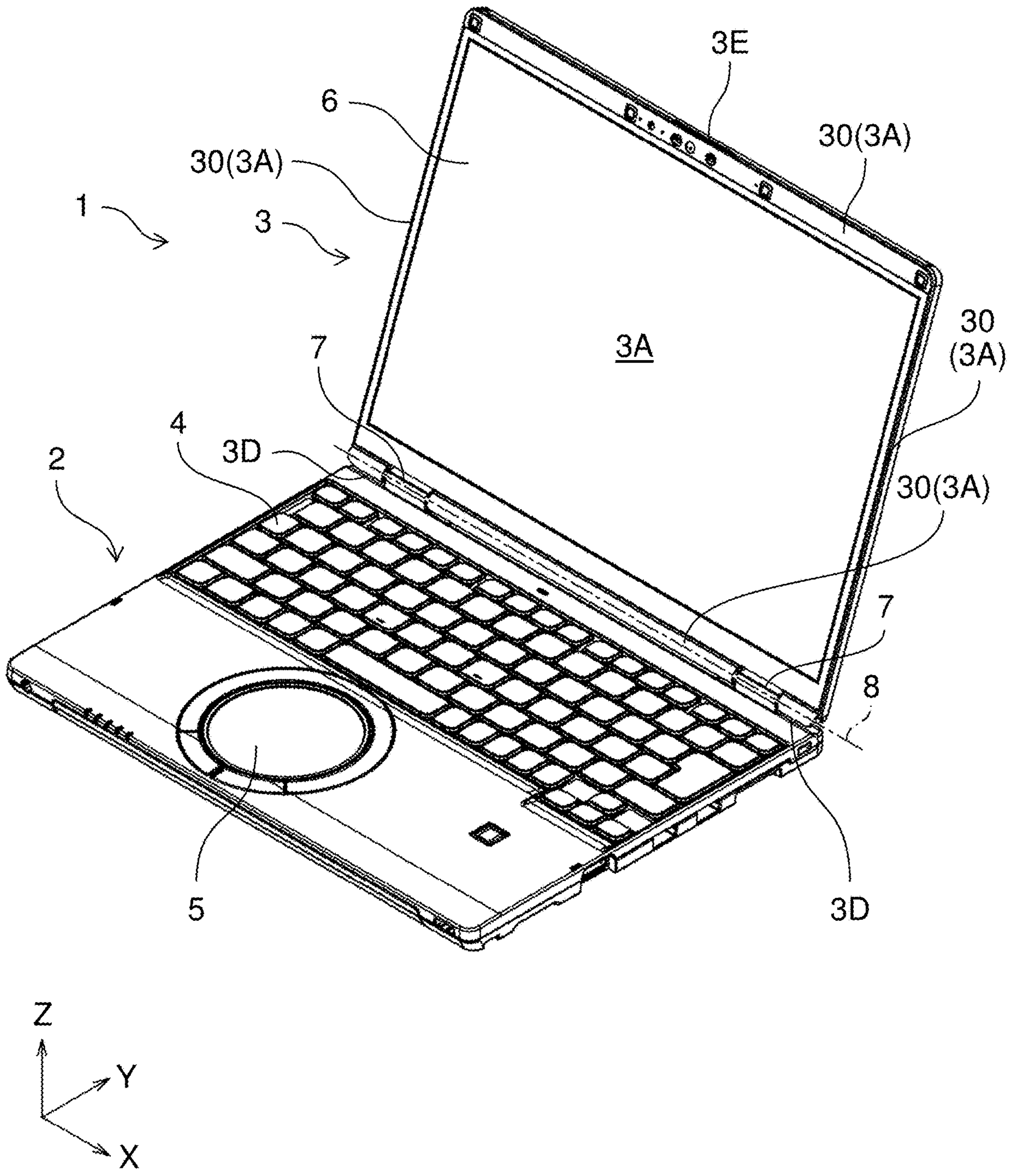
FIG. 1 is a perspective view illustrating an example of an electronic device according to an exemplary embodiment of the present disclosure as viewed from the front.

FIG. 1 is a perspective view illustrating an example of an electronic device according to an exemplary embodiment of the present disclosure as viewed from the front. X, Y, and Z directions in the drawing indicate a width direction of first housing 2 (a longitudinal direction of first housing 2), a depth direction (a lateral direction of first housing 2), and a height direction (a thickness direction of first housing 2), respectively. The X, Y, and Z directions are orthogonal to one another.

As illustrated in FIG. 1, electronic device 1 is a notebook personal computer (laptop PC). Electronic device 1 includes first housing 2 and second housing 3. Each of first housing 2 and second housing 3 has a thin box-shaped outer shell, and has a rectangular shape as viewed from an upper surface side.

First housing 2 houses keyboard 4 and touch pad 5. In other words, keyboard 4 and touch pad 5 are disposed in first housing 2. Second housing 3 houses liquid crystal panel 6. In other words, liquid crystal panel 6 is disposed in second housing 3. Keyboard 4 and touch pad 5 are examples of an input unit. Liquid crystal panel 6 is an example of a display. In the present specification, keyboard 4 and touch pad 5 are sometimes referred to as input units 4 and 5, and liquid crystal panel 6 is sometimes referred to as display 6.

First housing 2 and second housing 3 are coupled via hinges 7. Hinges 7 are provided at end portions of first housing 2 in the depth direction (Y direction). Hinges 7 connect first housing 2 and second housing 3 to each other to be rotatable about rotation axis 8. Rotation axis 8 of first housing 2 and second housing 3 is parallel to the X direction. At least one of first housing 2 and second housing 3 is rotated by hinges 7, and the electronic device can be opened or closed. Specifically, electronic device 1 can be brought into an open state and a closed state by hinges 7. The "open state" means a state where first housing 2 and second housing 3 are separated from each other and input units 4 and 5 and display 6 are exposed. The "closed state" means a state where first housing 2 and second housing 3 are disposed to face each other in the Z direction, input units 4 and 5 and display 6 face each other, and input units 4 and 5 and display 6 are not exposed.

Figure 2:
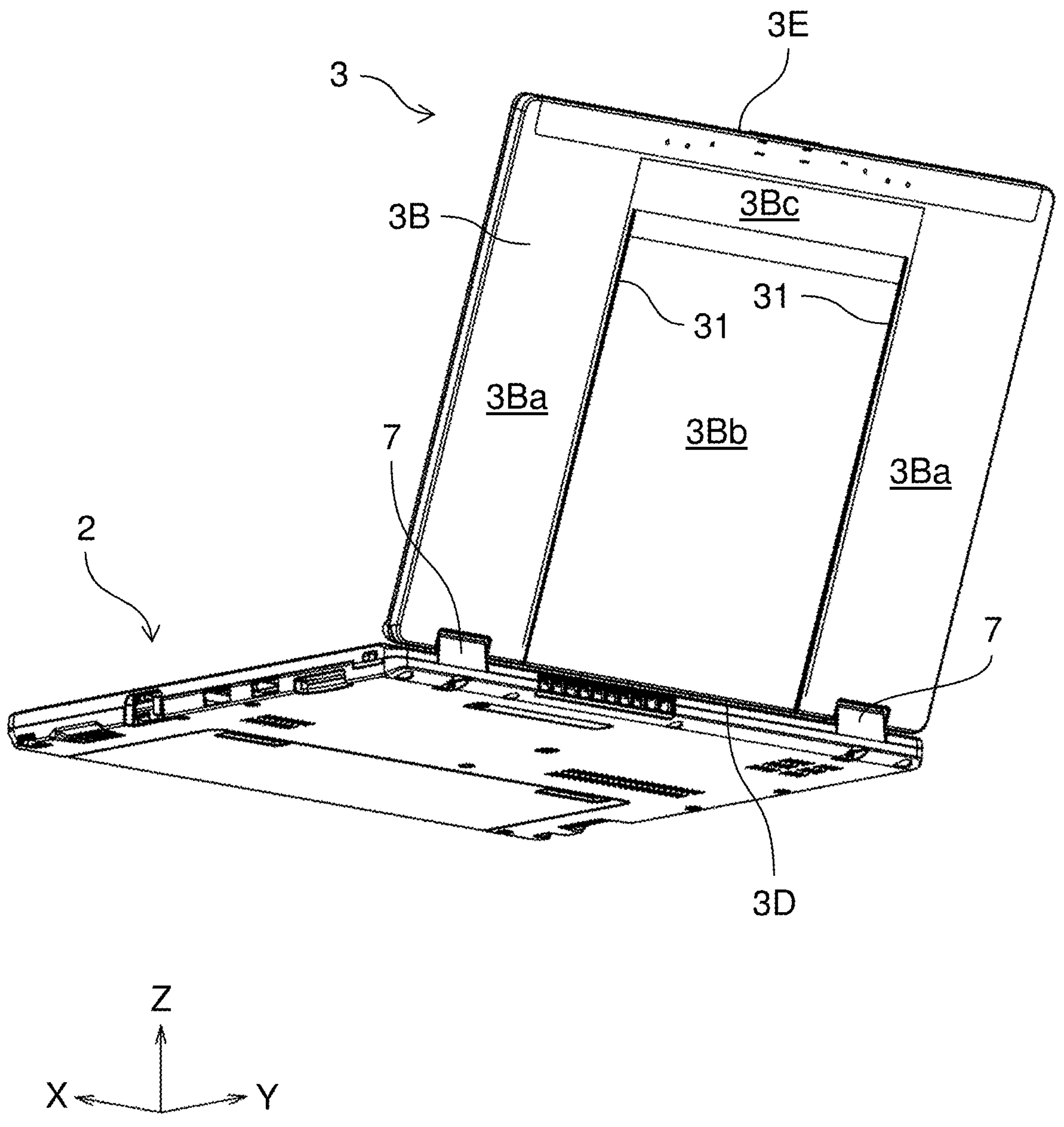
FIG. 2 is a perspective view illustrating an example of the electronic device according to the exemplary embodiment of the present disclosure as viewed from the rear.
Figure 3:
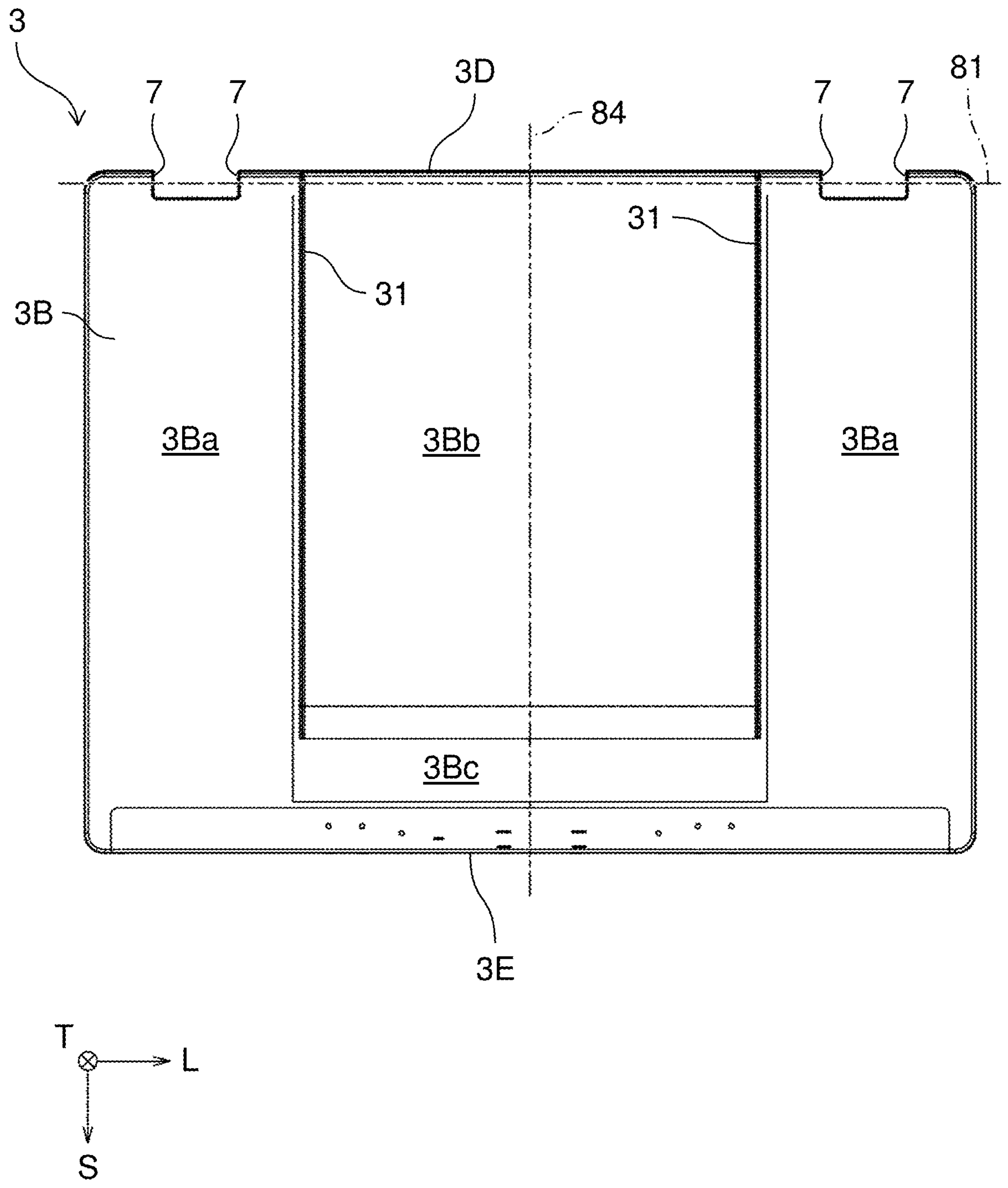
FIG. 3 is a plan view of a second housing.
Figure 4:
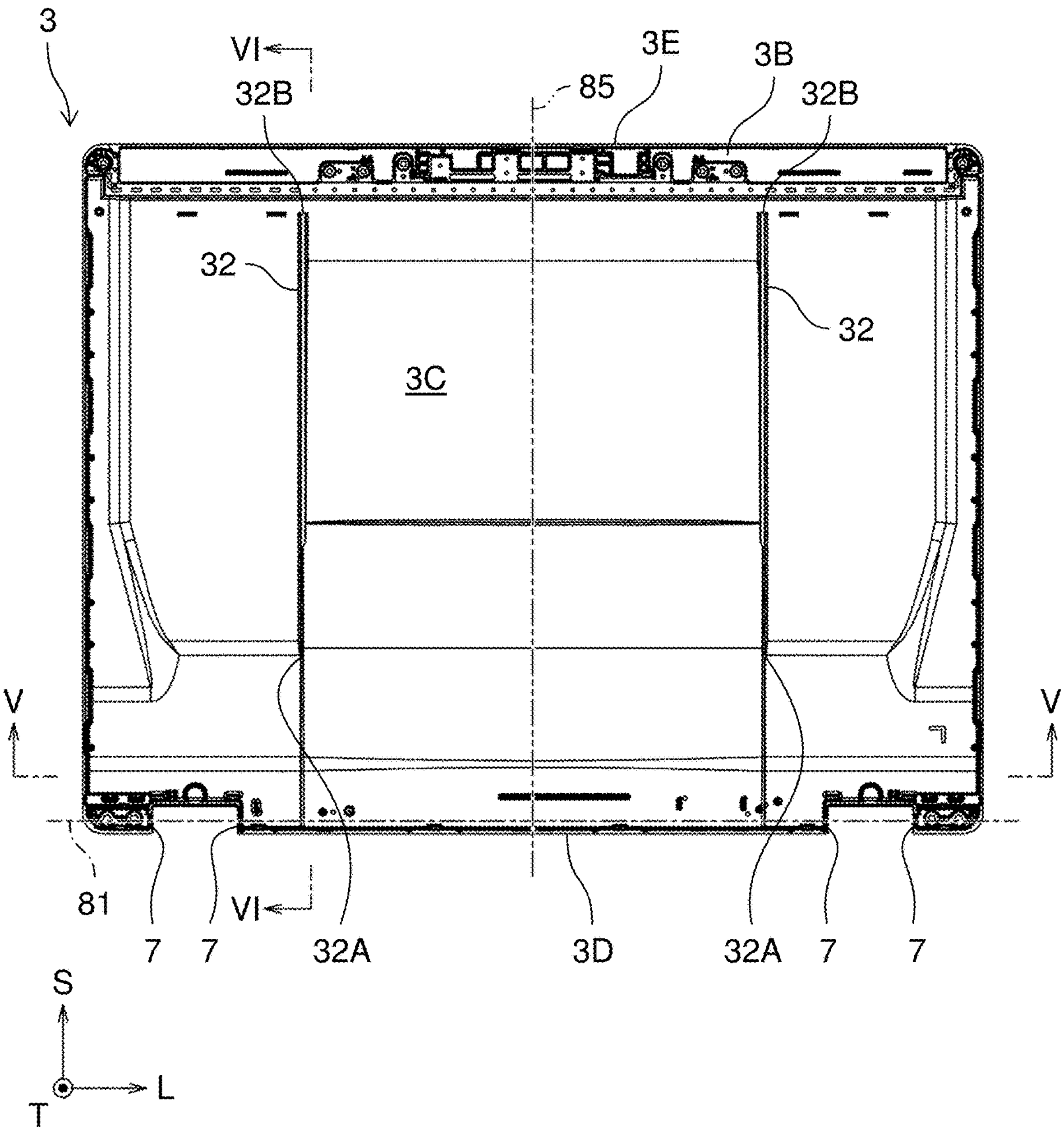
FIG. 4 is a bottom view of the second housing.

FIG. 2 is a perspective view illustrating an example of the electronic device according to the exemplary embodiment of the present disclosure as viewed from the rear. FIG. 3 is a plan view of the second housing. FIG. 4 is a bottom view of the second housing.

Hereinafter, a configuration of second housing 3 will be described in detail. L, S, and T directions in FIG. 3 and subsequent drawings indicate a width direction of second housing 3 (a longitudinal direction of second housing 3), a depth direction (a lateral direction of second housing 3), and a height direction (a thickness direction of second housing 3), respectively. The L, S, and T directions are orthogonal to each other. In the "closed state" described above, the L direction is parallel to the X direction and rotation axis 8, the S direction is parallel to the Y direction, and the T direction is parallel to the Z direction. In the "open state" described above, the L direction is parallel to the X direction, but the S and T directions are not parallel to the Y and Z directions, respectively. The S and T directions are orthogonal to rotation axis 8. The S direction is an example of an intersecting direction and an orthogonal direction.

As illustrated in FIGS. 1 to 4, second housing 3 includes first outer surface 3A (see FIG. 1), second outer surface 3B (see FIGS. 2 and 3), and inner surface 3C (see FIG. 4). First outer surface 3A and second outer surface 3B are opposite to each other. Inner surface 3C is a back surface of second outer surface 3B. The L and S directions are parallel to each of first outer surface 3A, second outer surface 3B, and inner surface 3C. The T direction is orthogonal to each of first outer surface 3A, second outer surface 3B, and inner surface 3C.

Second housing 3 includes base end 3D and distal end 3E. Hinges 7 which are rotating base ends of second housing 3 are disposed at base end 3D. Distal end 3E is a rotating distal end of second housing 3, and is positioned on a side opposite to base end 3D in the S direction.

As illustrated in FIG. 1, second housing 3 includes frame body 30. Frame body 30 is attached to a side of second housing 3 facing first housing 2 in the "closed state". Liquid crystal panel 6 is attached to an inside of frame body 30. As a result, frame body 30 is exposed at an outer edge portion of second housing 3 on the side facing first housing 2 in the "closed state", and liquid crystal panel 6 is exposed inside the outer edge portion. Exposed frame body 30 and liquid crystal panel 6 form first outer surface 3A. A portion of second housing 3 excluding the outer edge portion on the side facing first housing 2 in the "closed state" is covered with liquid crystal panel 6. The portion excluding the outer edge portion is inner surface 3C illustrated in FIG. 4, and inner surface 3C faces liquid crystal panel 6 in the T direction. Note that, FIG. 4 illustrates second housing 3 from which frame body 30 and liquid crystal panel 6 are removed.

As illustrated in FIGS. 2 and 3, two stepped portions 31 are formed on second outer surface 3B. Each of two stepped portions 31 extends in the S direction. As illustrated in FIG. 3, two stepped portions 31 are provided plane-symmetrically with respect to a virtual plane that passes through virtual straight line 84 indicated by a dashed double-dotted line and is perpendicular to the L direction. Virtual straight line 84 is a line passing through a center of second outer surface 3B in the L direction and extending in the S direction along second outer surface 3B as viewed from the T direction.

Each of two stepped portions 31 is formed between an end and a center of second outer surface 3B in the L direction. The center of second outer surface 3B in the L direction is a position of virtual straight line 84.

In the present exemplary embodiment, stepped portion 31 is provided by bending a plate-shaped member having substantially the same thickness such as a sheet metal.

Figure 5:
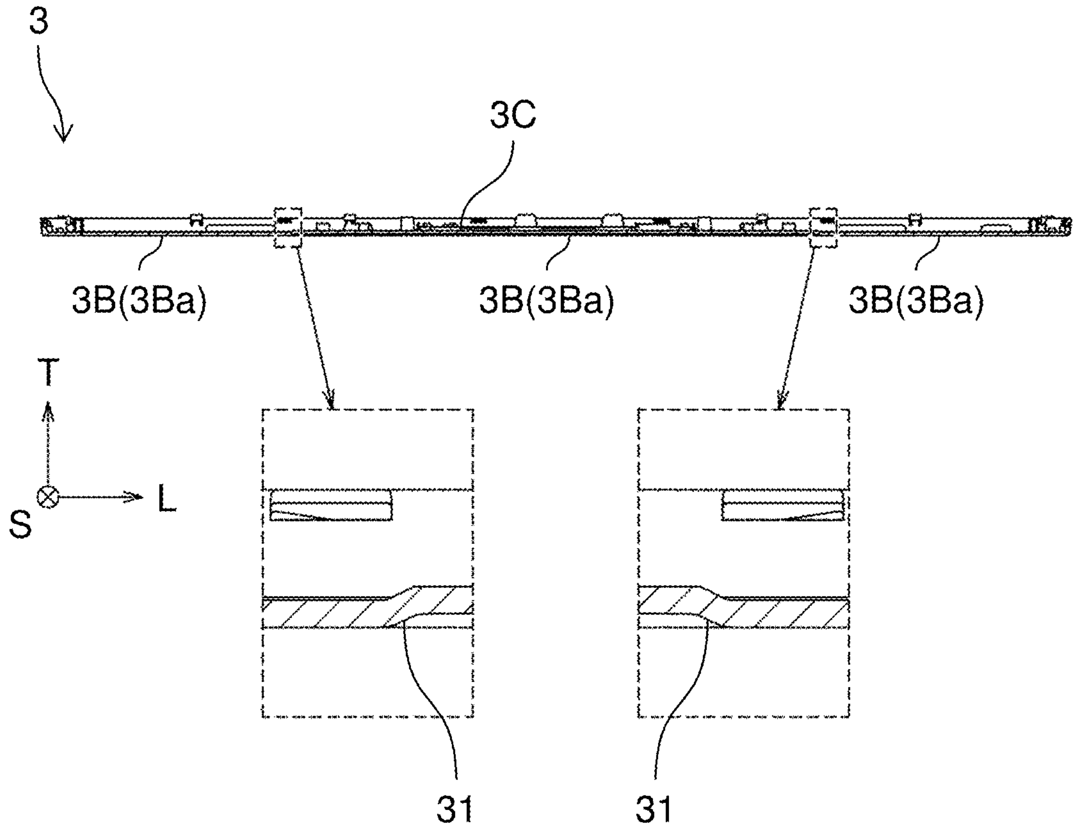
FIG. 5 is a sectional view of the second housing of FIG. 4 taken along line V-V.

FIG. 5 is a sectional view of the second housing of FIG. 4, taken along line A-A. As illustrated in FIGS. 3 and 5, a central side of second outer surface 3B in the L direction with respect to stepped portion 31 is recessed with respect to an end side of second outer surface 3B in the L direction with respect to stepped portion 31. That is, region 3Bb of second outer surface 3B between two stepped portions 31 in the L direction is recessed with respect to region 3Ba of second outer surface 3B outside stepped portions 31 in the L direction.

Figure 6:
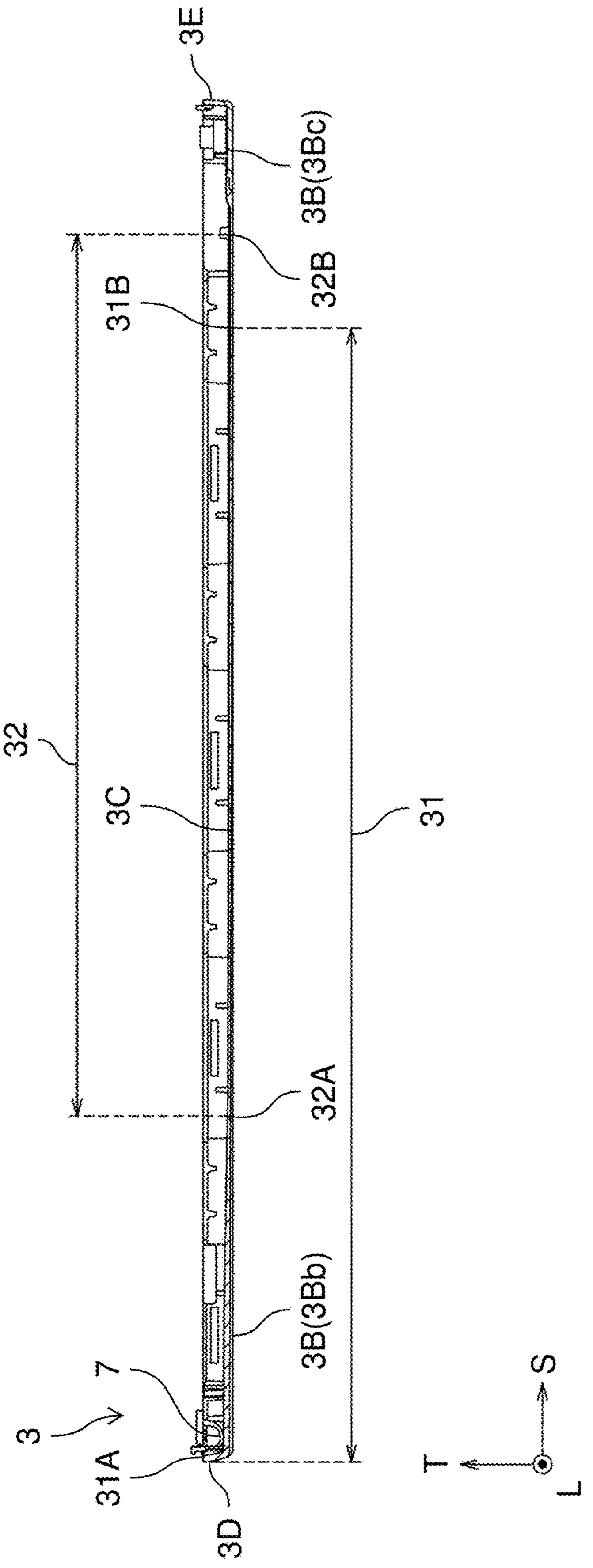
FIG. 6 is a sectional view of the second housing of FIG. 4 taken along line VI-VI.
Figure 7:
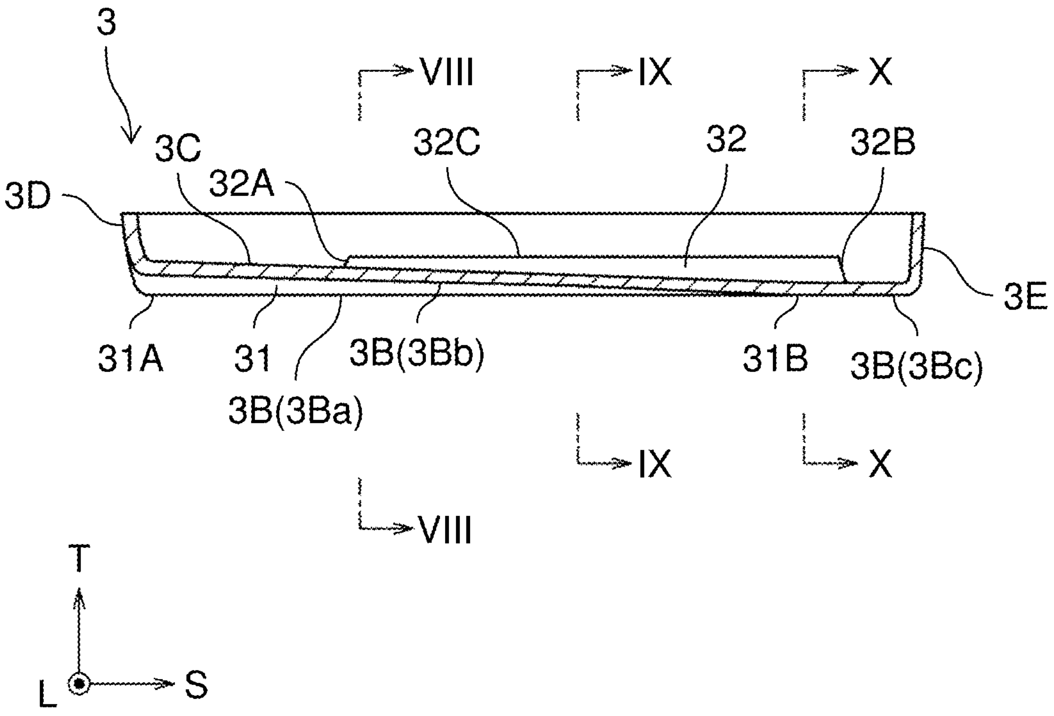
FIG. 7 is a schematic view schematically illustrating a sectional view of FIG. 6.

FIG. 6 is a sectional view of the second housing of FIG. 4 taken along line VI-VI. FIG. 7 is a schematic view schematically illustrating a sectional view of FIG. 6. As illustrated in FIGS. 3, 6, and 7, stepped portion 31 extends in the S direction from base end 3D toward distal end 3E. In the S direction, one end 31A of stepped portion 31 is positioned at base end 3D. In the present exemplary embodiment, stepped portion 31 does not extend to distal end 3E. In the S direction, other end 31B of stepped portion 31 is at a position different from distal end 3E. That is, stepped portion 31 is formed at an interval from distal end 3E. As a result, as illustrated in FIGS. 3 and 7, second outer surface 3B has region 3Bc where stepped portion 31 is not formed between stepped portion 31 and distal end 3E in the S direction. In the present exemplary embodiment, a case where "stepped portion 31 is not formed" means that the region is flat. That is, in the present exemplary embodiment, region 3Bc is a flat region.

In the present exemplary embodiment, base end 3D side in the S direction, in other words, hinge 7 side of second housing 3 corresponds to one side in the S direction. In addition, in the present exemplary embodiment, distal end 3E side in the S direction, in other words, a rotating distal end side of second housing 3 on a side opposite to hinges 7 of second housing 3 corresponds to the other side in the S direction.

As illustrated in FIG. 4, two ribs 32 are formed on inner surface 3C. Each of two ribs 32 extends in the S direction. Similarly to two stepped portions 31, two ribs 32 are provided plane-symmetrically with respect to a virtual plane that passes through virtual straight line 85 and is perpendicular to the L direction. Virtual straight line 85 is a line passing through a center of inner surface 3C in the L direction and extending in the S direction along inner surface 3C as viewed from the T direction. The center of inner surface 3C in the L direction is a position of virtual straight line 85. In the present exemplary embodiment, the position of virtual straight line 85 in the L direction is the same as the position of virtual straight line 84 in the L direction. Similarly to two stepped portions 31, each of two ribs 32 is formed between an end of inner surface 3C in the L direction and virtual straight line 85.

As illustrated in FIGS. 4, 6, and 7, rib 32 is formed at an interval from each of base end 3D and distal end 3E in the S direction. As illustrated in FIGS. 6 and 7, in the S direction, one end 32A of rib 32 is positioned between one end 31A and other end 31B of stepped portion 31. In the S direction, other end 32B of rib 32 is positioned between other end 31B of stepped portion 31 and distal end 3E of second housing 3. That is, a part of rib 32 is at a position overlapping stepped portion 31 in the S direction. In addition, another part of rib 32 is provided between stepped portion 31 and distal end 3E in the S direction.

That is, the other part of rib 32 is provided on a back surface of region 3Bc of second outer surface 3B where stepped portion 31 is not formed. That is, rib 32 is continuously provided from the back surface of region 3Bc of second outer surface 3B where stepped portion 31 is not formed to a back surface of a region of second outer surface 3B where stepped portion 31 is formed.

Usually, stress easily concentrates at a start point where stepped portion 31 is formed (for example, other end 31B of stepped portion 31). In the present exemplary embodiment, as described above, rib 32 is formed over a back surface of the start point where stepped portion 31 is formed and back surfaces on both sides of the start point in the S direction. As a result, the strength of the start point where stepped portion 31 is formed can be set to be higher than in a configuration in which rib 32 is provided only on the back surface of the region of second outer surface 3B where stepped portion 31 is formed. That is, it is possible to reinforce the start point of stepped portion 31 where stress is easily collected.

Figure 8:
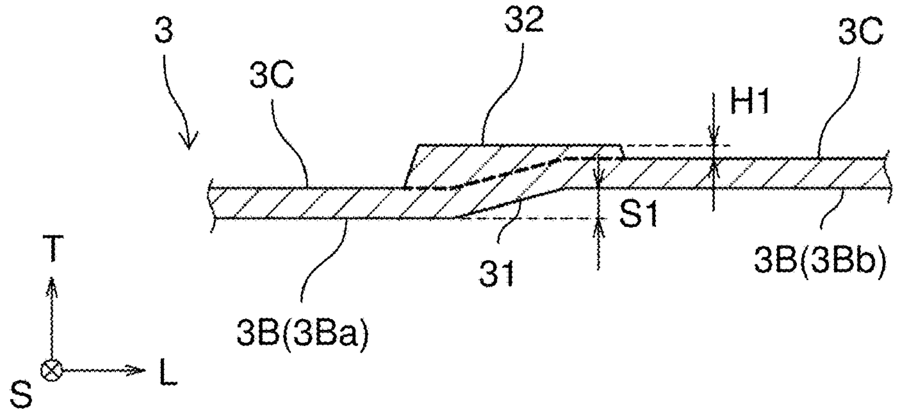
FIG. 8 is a sectional view of the second housing of FIG. 7 taken along line VIII-VIII.
Figure 9:
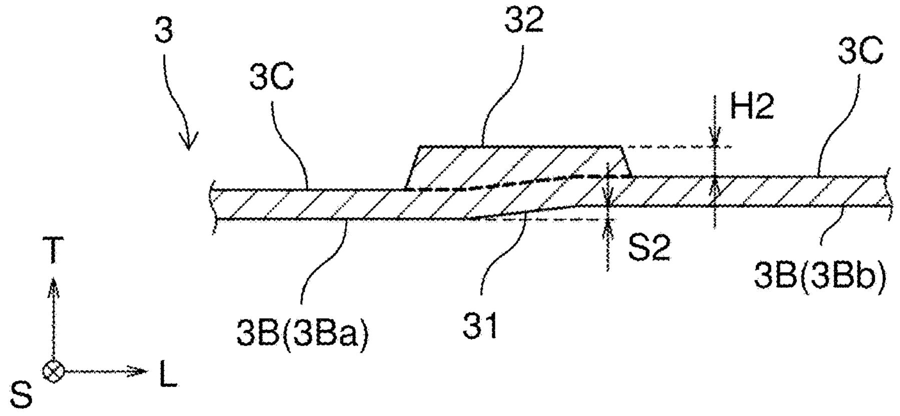
FIG. 9 is a sectional view of the second housing of FIG. 7 taken along line IX-IX.
Figure 10:
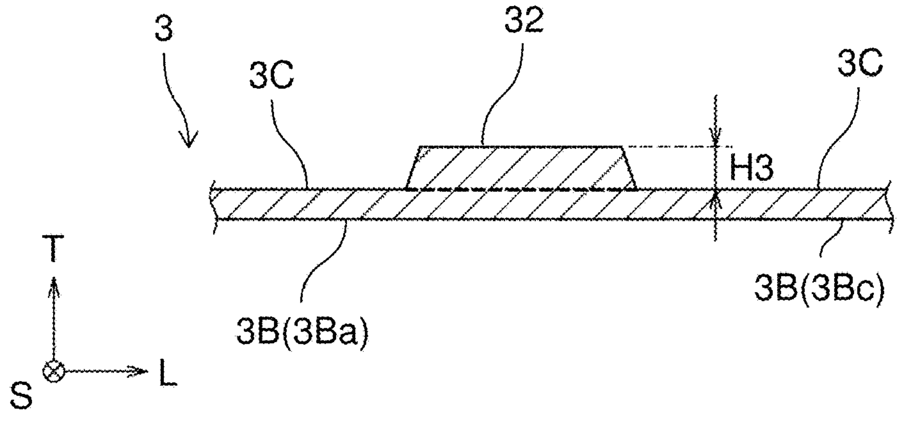
FIG. 10 is a sectional view of the second housing of FIG. 7 taken along line X-X.

FIG. 8 is a sectional view of the second housing of FIG. 7 taken along line VIII-VIII. FIG. 9 is a sectional view of the second housing of FIG. 7 taken along line IX-IX. FIG. 10 is a sectional view of the second housing of FIG. 7 taken along line X-X.

As illustrated in FIGS. 8 and 9, rib 32 is provided at a position overlapping stepped portion 31 in the L direction. As illustrated in FIG. 7, a part of rib 32 is provided at a position overlapping stepped portion 31 as viewed from the T direction orthogonal to second outer surface 3B. In FIGS. 8 and 9, a length of rib 32 in the L direction is longer than a length of stepped portion 31 in the L direction. In other words, rib 32 is wider than stepped portion 31.

As illustrated in FIGS. 6 and 7, a length of stepped portion 31 in the T direction, that is, a size of stepped portion 31 decreases from base end 3D side toward distal end 3E side of second outer surface 3B. In the present exemplary embodiment, a change in the size of stepped portion 31 is caused by region 3Bb being inclined with respect to region 3Ba on second outer surface 3B. For example, size S1 of stepped portion 31 at the position illustrated in FIG. 8 is larger than size S2 of stepped portion 31 at the position illustrated in FIG. 9. Note that, there is no stepped portion 31 at the position illustrated in FIG. 10.

As illustrated in FIGS. 6 and 7, a height of region 3Bb of rib 32 from the back surface in the S direction increases from base end 3D side toward distal end 3E side of second outer surface 3B. A portion of rib 32 between one end 31A and other end 32B of stepped portion 31 in the S direction is a portion of rib 32 overlapping stepped portion 31 in the S direction. The height of rib 32 is a length of rib 32 in the T direction. In the present exemplary embodiment, a change in the height of rib 32 is caused by a portion of inner surface 3C on the back surface of region 3Bb of second outer surface 3B being inclined with respect to region 3Ba of second outer surface 3B. Thus, in the present exemplary embodiment, protruding distal end surface 32C of rib 32 is parallel to region 3Ba. For example, height H1 of rib 32 at the position illustrated in FIG. 8 is lower than height H2 of rib 32 at the position illustrated in FIG. 9, and height H2 is lower than height H3 of rib 32 at the position illustrated in FIG. 10. Note that, the change in the height of rib 32 may be caused by protruding distal end surface 32C of rib 32 being inclined with respect to the S direction.

A height of a portion of rib 32 between other end 31B of stepped portion 31 and distal end 3E of second housing 3 in the S direction is constant. The portion of rib 32 between other end 31B of stepped portion 31 and distal end 3E of second housing 3 in the S direction is a portion of rib 32 that does not overlap stepped portion 31 in the S direction.

A rate at which the size of stepped portion 31 decreases from base end 3D side toward distal end 3E side in the S direction is equal to a rate at which the height of rib 32 increases from base end 3D side toward distal end 3E side in the S direction.

Note that, in the present exemplary embodiment, the sizes, the positions in the S direction, and the like at the positions of two stepped portions 31 are the same. In addition, in the present exemplary embodiment, the configuration such as the heights and the positions in the S direction at the positions of two ribs 32 are the same.

Effects

With electronic device 1 according to the present exemplary embodiment, the following effects can be achieved.

According to the present exemplary embodiment, the size of stepped portion 31 decreases from one side to the other side of second outer surface 3B in the S direction. As a result, the rate at which the size of stepped portion 31 decreases can be variously set. In addition, as a result, it is possible to set two directions in which stepped portion 31 decreases, for example, two directions of a direction from base end 3D side toward distal end 3E side and a direction from distal end 3E side toward base end 3D side. As described above, a degree of freedom in design of second outer surface 3B can be increased as compared with the configuration in which the size of stepped portion 31 is constant.

According to the present exemplary embodiment, rib 32 extending in the S direction is formed on inner surface 3C which is the back surface of second outer surface 3B. In addition, a height of the portion of rib 32 overlapping stepped portion 31 in the S direction increases from one side to the other side of inner surface 3C in the S direction. That is, the height of rib 32 is high on a back side of a portion where stepped portion 31 decreases and low on a back side of a portion where stepped portion 31 is large. As a result, rib 32 having a high height can suppress a decrease in strength of second housing 3 due to small stepped portion 31. In addition, rib 32 is configured to be low on the back side of the portion where stepped portion 31 is large, and thus, it is possible to suppress an increase in second housing 3 in the T direction.

Normally, liquid crystal panel 6 disposed to face inner surface 3C of second housing 3 is positioned on the back side of the portion where stepped portion 31 is not formed. Thus, in a case where rib 32 is formed on the back side of the portion, a disposition space of liquid crystal panel 6 becomes small. In the present exemplary embodiment, in a case where rib 32 is provided at the position overlapping stepped portion 31 as viewed from the T direction, rib 32 is positioned on the back side of the portion where stepped portion 31 is formed. Thus, a decrease in the disposition space of liquid crystal panel 6 can be suppressed.

According to the present exemplary embodiment, since rib 32 is increased at the same rate at which the size of stepped portion 31 decreases, a difference in strength of second housing 3 due to a difference in position in the S direction can be reduced.

According to the present exemplary embodiment, rib 32 is wider than stepped portion 31, the strength of second housing 3 can be increased as compared with the configuration in which a width of rib 32 is less than or equal to a width of stepped portion 31.

According to the present exemplary embodiment, stepped portion 31 is formed at an interval from distal end 3E. That is, since stepped portion 31 is not present at the portion of the interval, the strength of second housing 3 decreases at the portion of the interval. However, according to the present exemplary embodiment, rib 32 is provided at the portion of the interval, and thus, it is possible to suppress the decrease in the strength of second housing 3 described above.

According to the present exemplary embodiment, a central side of second outer surface 3B in the L direction is recessed, and thus, it is possible to improve the strength of second housing 3 while setting the appearance of second housing 3 to look thin.

According to the present exemplary embodiment, it is possible to form the stepped portion such that stepped portion 31 on rotation axis 8 side (base end 3D side) of second housing 3 is large and stepped portion 31 on the distal end side (distal end 3E side) of the rotation of second housing 3 decreases.

According to the present exemplary embodiment, since stepped portion 31 is provided plane-symmetrically with respect to the virtual plane passing through virtual straight line 84 and perpendicular to the L direction, it is possible to suppress an extreme difference from occurring between the strength on one side in the L direction and the strength on the other side in the L direction with respect to virtual straight line 84. In addition, the design of second housing 3 can be improved.

In the present exemplary embodiment, an example in which stepped portion 31 and rib 32 extend in the S direction has been described, but the present disclosure is not limited thereto. Stepped portion 31 and rib 32 may extend in a direction inclined with respect to the S direction. That is, stepped portion 31 may not be parallel to the S direction. In this case, a direction in which stepped portion 31 extends (the direction inclined with respect to the S direction) corresponds to the intersecting direction. That is, the intersecting direction is not limited to a direction orthogonal to rotation axis 8, but is a direction intersecting rotation axis 8.

In the present exemplary embodiment, an example in which both stepped portion 31 and rib 32 extend in the S direction has been described, but the present disclosure is not limited thereto. The extending direction of stepped portion 31 and an extending direction of rib 32 may be different. For example, stepped portion 31 may extend in the S direction, and rib 32 may extend in the direction inclined with respect to the S direction.

In the present exemplary embodiment, an example in which two stepped portions 31 and two ribs 32 are formed has been described, but the present disclosure is not limited thereto. One stepped portion 31 and one rib 32 may be formed, or three or more stepped portion or three or more ribs may be formed. In addition, the number of stepped portions 31 and the number of ribs 32 may be different. For example, one stepped portion 31 may be formed and three ribs 32 may be formed.

In the present exemplary embodiment, an example in which stepped portion 31 and rib 32 are plane-symmetric with respect to the virtual plane passing through the virtual straight line and perpendicular to the L direction has been described, but stepped portion 31 and rib 32 may not be plane-symmetric. In addition, one of stepped portion 31 and rib 32 may be plane-symmetric, and the other of stepped portion 31 and rib 32 may not be plane-symmetric.

In the present exemplary embodiment, an example in which stepped portions 31 have the same configuration and ribs 32 have the same configuration has been described, but stepped portions 31 may have different configurations, or ribs 32 may have different configurations. For example, the sizes of stepped portions 31 may be different from each other, or the heights of ribs 32 may be different from each other.

In the present exemplary embodiment, an example in which stepped portion 31 extends from base end 3D and is formed with the interval from distal end 3E has been described, but the present disclosure is not limited thereto. For example, stepped portion 31 may extend from distal end 3E and be formed at an interval from base end 3D, or may be formed at an interval from both base end 3D and distal end 3E. Similarly, an example in which rib 32 is formed at an interval from both base end 3D and distal end 3E has been described, but the present disclosure is not limited thereto.

In the present exemplary embodiment, the example in which, in the S direction, one end 32A of rib 32 is positioned between one end 31A and other end 31B of stepped portion 31, and other end 32B of rib 32 is positioned between other end 31B of stepped portion 31 and distal end 3E of second housing 3 has been described, but the present disclosure is not limited thereto. For example, in the S direction, one end 32A of rib 32 may be positioned between base end 3D and one end 31A of stepped portion 31, and other end 32B of rib 32 may be positioned between one end 31A and other end 31B of stepped portion 31.

In the present exemplary embodiment, an example in which a part of rib 32 is at the position overlapping stepped portion 31 in the S direction has been described, but the present disclosure is not limited thereto. For example, entire rib 32 may be positioned at the position overlapping stepped portion 31 in the S direction. That is, at least a part of rib 32 may be at the position overlapping stepped portion 31 in the S direction.

In the present exemplary embodiment, an example in which a part of rib 32 is provided between stepped portion 31 and distal end 3E in the S direction has been described, but the present disclosure is not limited thereto. For example, a part of rib 32 may be provided between stepped portion 31 and base end 3D in the S direction. In addition, for example, a part of rib 32 may be provided between stepped portion 31 and base end 3D in the S direction, and another part of rib 32 may be provided between stepped portion 31 and distal end 3E in the S direction. In addition, for example, entire rib 32 may be provided between one end 31A and other end 31B of stepped portion 31 in the S direction.

In the present exemplary embodiment, an example in which rib 32 is provided at the position overlapping stepped portion 31 as viewed from the T direction has been described, but the present disclosure is not limited thereto. For example, rib 32 may be provided at a position between stepped portion 31 and a center (virtual straight lines 84 and 85) of second outer surface 3B in the L direction.

In the present exemplary embodiment, an example in which the size of stepped portion 31 decreases from base end 3D side toward distal end 3E side has been described, but conversely, the size of stepped portion 31 may increase from base end 3D side toward distal end 3E side.

In the present exemplary embodiment, an example in which the height of rib 32 increases from base end 3D side toward distal end 3E side has been described, but conversely, the height of rib 32 may decrease from base end 3D side toward distal end 3E side.

In the present exemplary embodiment, the example in which the rate at which the size of stepped portion 31 decreases from base end 3D side toward distal end 3E side is equal to the rate at which the height of rib 32 increases from base end 3D side toward distal end 3E side has been described, but the present disclosure is not limited thereto. That is, the rate at which the size of stepped portion 31 decreases from base end 3D side toward distal end 3E side may be different from the rate at which the height of rib 32 increases from base end 3D side toward distal end 3E side.

Although the present disclosure has been fully described with reference to a preferred exemplary embodiment and with reference to the accompanying drawings, various variations and modifications will become apparent to those skilled in the art. Such variations and modifications are to be understood as being included within the scope of the present disclosure as set forth in the appended claims, unless departing from the scope of the present disclosure.

Overview of Exemplary Embodiments (1) An electronic device according to a first aspect of the present disclosure includes a first housing in which an input unit is disposed, and a second housing rotatably coupled to the first housing via a hinge, the second housing having a display disposed therein. The second housing includes a first outer surface from which the display is exposed, a second outer surface facing away from the first outer surface, a stepped portion is provided on the second outer surface, the stepped portion extending in an intersecting direction that intersects with a rotation axis of the first housing and the second housing and is parallel to the second outer surface, a rib extending in the intersecting direction is provided on an inner surface that is a back surface of the second outer surface, at least a part of the rib is at a position overlapping the stepped portion in the intersecting direction, the rib is provided at the position overlapping the stepped portion as viewed from a direction orthogonal to the second outer surface, or at a position between the stepped portion and a center of the second outer surface in a width direction parallel to the rotation axis, a size of the stepped portion decreases from one side to another side of the second outer surface in the intersecting direction, and a height of the rib at a portion overlapping the stepped portion in the intersecting direction increases from one side to another side of the inner surface in the intersecting direction.

(2) In the electronic device according to (1), a rate at which the size of the stepped portion decreases from the one side to the other side in the intersecting direction may be equal to a rate at which the height of the rib increases from the one side to the other side in the intersecting direction.

(3) In the electronic device according to (1) or (2), a length of the rib in the width direction may be longer than a length of the stepped portion in the width direction.

(4) In the electronic device according to any one of (1) to (3), the second housing may include a base end at which the hinge is disposed and a distal end positioned on a side opposite to the base end in an orthogonal direction orthogonal to the rotation axis and parallel to the second outer surface, the stepped portion may be provided at an interval from at least one of the base end and the distal end, and a part of the rib may be provided in at least one of between the stepped portion and the base end and between the stepped portion and the distal end in the orthogonal direction.

(5) In the electronic device according to any one of (1) to (4), the stepped portion may be provided between an end and a center of the second outer surface in the width direction, and a central side of the second outer surface in the width direction with respect to the stepped portion may be recessed with respect to an end side of the second outer surface in the width direction with respect to the stepped portion.

(6) In the electronic device according to any one of (1) to (5), the one side in the intersecting direction may be the hinge side in the second housing, and the other side in the intersecting direction may be a rotating distal end side of the second housing on a side opposite to the hinge in the second housing.

(7) In the electronic device according to any one of (1) to (6), the stepped portion may be provided plane-symmetrically with respect to a virtual plane that passes through a center of the second outer surface in the width direction and is perpendicular to the width direction.

INDUSTRIAL APPLICABILITY

The present disclosure is useful for an electronic device (for example, a laptop PC or the like) that includes a first housing in which an input unit is disposed, and a second housing rotatably coupled to the first housing via a hinge and having a display disposed therein.

REFERENCE MARKS IN THE DRAWINGS

1 electronic device
2 first housing
3 second housing
31 stepped portion
32 rib
3A first outer surface
3B second outer surface
3C inner surface
3D base end
3E distal end
4 keyboard (input unit)
5 touch pad (input unit)
6 liquid crystal panel (display)
7 hinge
8 rotation axis
84, 85 virtual straight line

The invention claimed is:

1. An electronic device comprising:

a first housing in which an input unit is disposed; and a second housing that is rotatably coupled to the first housing via a hinge, the second housing having a display disposed, wherein the second housing includes a first outer surface on which the display is exposed, a second outer surface facing away from the first outer surface, a stepped portion is provided on the second outer surface, the stepped portion extending in an intersecting direction that intersects with a rotation axis of the first housing and the second housing and is parallel to the second outer surface, a rib extending in the intersecting direction is provided on an inner surface that is a back surface of the second outer surface, at least a part of the rib is at a position overlapping the stepped portion in the intersecting direction, the rib is provided at the position overlapping the stepped portion as viewed from a direction orthogonal to the second outer surface, or at a position between the stepped portion and a center of the second outer surface in a width direction parallel to the rotation axis, a size of the stepped portion decreases from one side to another side of the second outer surface in the intersecting direction, and a height of the rib at a portion overlapping the stepped portion in the intersecting direction increases from one side to another side of the inner surface in the intersecting direction.

2. The electronic device according to claim 1, wherein a rate at which the size of the stepped portion decreases from the one side to the other side in the intersecting direction is equal to a rate at which the height of the rib increases from the one side to the other side in the intersecting direction.

3. The electronic device according to claim 1, wherein a length of the rib in the width direction is longer than a length of the stepped portion in the width direction.

4. The electronic device according to claim 1, wherein the second housing includes a base end at which the hinge is disposed and a distal end positioned on a side opposite to the base end in an orthogonal direction orthogonal to the rotation axis and parallel to the second outer surface, the stepped portion is provided at an interval from at least one of the base end and the distal end, and a part of the rib is provided in at least one of between the stepped portion and the base end and between the stepped portion and the distal end in the orthogonal direction.

5. The electronic device according to claim 1, wherein the stepped portion is provided between an end and a center of the second outer surface in the width direction, and a central side of the second outer surface in the width direction with respect to the stepped portion is recessed with respect to an end side of the second outer surface in the width direction with respect to the stepped portion.

6. The electronic device according to claim 1, wherein the one side in the intersecting direction is the hinge side in the second housing, and the other side in the intersecting direction is a rotating distal end side of the second housing on a side opposite to the hinge in the second housing.

7. The electronic device according to claim 1, wherein the stepped portion is provided plane-symmetrically with respect to a virtual plane that passes through a center of the second outer surface in the width direction and is perpendicular to the width direction.

* * * * *